United States Patent [19]

Noguchi

[11] Patent Number: 5,500,738
[45] Date of Patent: Mar. 19, 1996

[54] ELECTROPHOTOGRAPHIC DIGITAL COPIER FOR PROVIDING BICOLOR COPIES BY A SINGLE IMAGE TRANSFER

[75] Inventor: Koichi Noguchi, Tokyo, Japan

[73] Assignee: Ricoh Company, Ltd., Tokyo, Japan

[21] Appl. No.: 465,572

[22] Filed: Jun. 5, 1995

Related U.S. Application Data

[63] Continuation of Ser. No. 288,891, Aug. 10, 1994, abandoned, which is a continuation of Ser. No. 836,693, Feb. 18, 1992, abandoned.

[30] Foreign Application Priority Data

Feb. 18, 1991 [JP] Japan ................................. 3-045881

[51] Int. Cl.⁶ .......................... H04N 1/29; G03G 15/01
[52] U.S. Cl. ...................... 358/300; 355/326 R; 347/232
[58] Field of Search ................................. 358/300, 296; 355/326 R, 327, 328; 347/112, 115, 232

[56] References Cited

U.S. PATENT DOCUMENTS 5,032,904 7/1991 Murai et al. .................... 355/327 X
5,162,821 11/1992 Fukuchi et al. .................... 346/157

FOREIGN PATENT DOCUMENTS 3408506 9/1984 Germany.
3625281 1/1987 Germany.
3836499 5/1989 Germany.

*Primary Examiner*—Peter S. Wong
*Assistant Examiner*—Eric Frahm
*Attorney, Agent, or Firm*—Oblon, Spivak, McClelland, Maier & Neustadt

[57] ABSTRACT

An electrophotographic digital copier for sequentially writing bicolor image data signals onto a photoconductive element and producing a bicolor hard copy by a single image transfer. The copier has a black developing device and a red developing device for developing respectively a latent image electrostatically formed by a black image data signal on a photoconductive element and a latent image electrostatically formed by a red image data signal. A signal detecting device determines whether or not the red image data is present. A control device starts the drive of the red developing device when the signal detecting device detects the red image data signal and ends the drive on upon the elapse of a predetermined period of time after the signal detecting device determines, during the driving of the red developing device that the red image data signal is absent.

13 Claims, 9 Drawing Sheets

ELECTROPHOTOGRAPHIC DIGITAL COPIER FOR PROVIDING BICOLOR COPIES BY A SINGLE IMAGE TRANSFER

This application is a Continuation of application Ser. No. 08/288,891, filed on Aug. 10, 1994, now abandoned; which is a continuation of application Ser. No. 07/836,693, filed Feb. 18, 1992, now abandoned.

BACKGROUND OF THE INVENTION

The present invention relates to an electrophotographic digital copier for sequentially writing bicolor image data signals in a photoconductive element and producing a bicolor hard copy by a single image transfer.

An electrophotographic image forming apparatus usually includes a photoconductive element in the form of a drum. While the drum is in rotation, a charger uniformly charges the surface of the drum to predetermined polarity. Image data is optically written on the charged surface of the drum to electrostatically form a latent image thereon. A developing device is driven substantially in synchronism with the rotation of the drum to develop the latent image formed on the drum by a toner. Thereafter, an image transferring device transfers the developed image or toner image to a recording medium implemented as a paper sheet. The problem with this kind of image forming apparatus is that when the ratio of an image represented by image data is small, the developing device simply idles over a substantial period of time without developing the image since it is driven substantially in synchronism with the drum. The idling results in various undesirable occurrences such as the deterioration and scattering of the developer, accidental deposition of the toner on reproduced images, and the decrease in the life of the apparatus due to degraded functions. To eliminate this problem, Japanese Patent Laid-Open Publication No. 134660/1990 teaches an image forming apparatus having a developing device which is spaced apart from an image writing position by a distance associated with a period of time necessary for the developing device to fully rise. Specifically, in the apparatus disclosed in this Laid-Open Publication, a clutch for driving the developing device is coupled when image data appears for the first time in each page, thereby causing a motor to drive the developing device. At the end of the page of interest or on the elapse of a predetermined period of time, the clutch associated with the developing device is uncoupled. The motor is shared by the developing device and photoconductive drum, i.e., it is also connected to the drum by another clutch.

The apparatus having the above construction, however, has some problems left unsolved, as follows. Locating the developing device at the above-mentioned distance from the image data writing position is undesirable when it comes to miniature apparatuses. Since the clutch associated with the developing device is coupled when image data appears for the first time in each page and uncoupled at the end of the page or on the elapse of a predetermined period of time, the developing device is not free from substantial idling when an image exists only at the leading edge portion of a page. Especially, assume such an anti-idling scheme is applied to a developing device of a copier of the type producing a bicolor hard copy, e.g., a red developing device of a copier capable of producing a bicolor hard copy in black and red. Then, the conventional anti-idling scheme cannot achieve the expected advantage when a date stamp or a seal impression is present at the leading edge of an image. Further, since the developing unit and drum share a single motor, turning on and off the developing device via the clutch causes the load acting on the motor to sharply change with the result that the rotation of the drum is effected to disturb the image.

There has been proposed a digital copier having a reading device for receiving an image light from a material to be copied to produce black image dater and separating image data of particular color, e.g., red image data from the black image data, a first writing device for writing the black image data in a photoconductive element to electrostatically form a latent image, a first developing device for developing the latent image to produce a toner image, a second writing means for writing, after the development by the first developing device, the red image data in the photoconductive element after delaying it a predetermined period of time to thereby form a latent image over the toner image, a second developing device for developing the latent image formed by the second writing device to produce a toner image, an image transferring device for transferring the two toner images to a paper sheet at the same time, and a driving device for driving the developing devices from the beginning to the end of a copying operation. The continuous drive of the developing devices from the beginning to the end of a copying operation is effected so that red image may be written and developed whenever it appears. This also gives rise to the idling problem and, therefore, the previously stated undesirable occurrences when the ratio of an image represented by red image data is small. This is especially true with ordinary documents for office use since most of such documents carry information in black thereon. Exceptional documents used in offices and on which information is printed in red are those having red date stamps or red seal impressions, those having red underlines, those having red corrections, etc. A majority of such red portions center around a particular position of a document or are far smaller in area than black portions.

SUMMARY OF THE INVENTION

It is, therefore, an object of the present invention to provide a digital copier which reduces the idling of a developing device, has a small size, and eliminates the disturbance to a reproduced image ascribable to changes in the load acting on the motor.

In accordance with the present invention, a digital copier comprises a photoconductive element, a reading device for receiving an optical image from a material to be copied to thereby produce a first and a second record signal each being associated with a particular color, a first writing device responsive to the first record signal for writing image data in the photoconductive element to thereby electrostatically form a latent image, a first developing device for developing the latent image to produce a toner image, a second writing device responsive to the second record signal for writing, after the first developing device has developed the latent image, image data in the photoconductive element to thereby electrostatically form a latent image over the toner image, a second developing device for developing the latent image formed by the second writing device to produce a toner image, an image transferring device for transferring the toner images formed by the first and second developing devices to a recording medium at the same time, a signal detecting device for determining whether or not the second record signal is present, and a control device for controlling the drive of the second developing device.

Also, in accordance with the present invention, a digital copier comprises a photoconductive element, a reading device for receiving an optical image from a material to be copied to thereby produce a first and a second record signal each being associated with a particular color, a first writing device responsive to the first record signal for writing image data in the photoconductive element to thereby electrostatically form a latent image, a first developing device for developing the latent image to produce a toner image, a second writing device responsive to the second record signal for writing, after the first developing device has developed the latent image, image data in the photoconductive element to thereby electrostatically form a latent image over the toner image, a second developing device controllably driven on the basis of presence/absence of the second record signal and driven, before the leading edge of the latent image formed by the second writing device passes the second developing device, for a predetermined period of time to develop the latent image to produce a toner image, and an image transferring device for transferring the toner images formed by the first and second developing devices to a recording medium at the same time.

Further, in accordance with the present invention, a digital copier comprises a photoconductive element, a reading device for receiving an optical image from a material to be copied to thereby produce a first and a second record signal each being associatd with a particular color, a first writing device responsive to the first record signal for writing image data in the photoconductive element to thereby electrostatically form a latent image, a first developing device for developing the latent image to produce a toner image, a second writing device responsive to the second record signal for writing, after the first developing device has developed the latent image, image data in the photoconductive element to thereby electrostatically form a latent image over the toner image, a second developing device controllably driven on the basis of presence/absence of the second signal and driven for a predetermined period of time at the beginning of every copying cycle prior to the formation of an image on the photoconductive element for developing the latent image formed by the second writing means to produce a toner image, and an image transferring device for transferring the toner images formed by the first and second developing devices to a recording medium at the same time.

In addition, in accordance with the present invention, a digital copier comprises a photoconductive element, a reading device for receiving an optical image from a material to be copied to thereby produce a first and a seccond record signal each being associated with a particular color, a first writing device responsive to the first record signal for writing image data in the photoconductive element to thereby electrostatically form a latent image, a first developing devie for developing the latent image to produce a toner image, a second writing device responsive to the second record signal for writing, after the first developing device has developed the latent image, image data in the photoconductive element to thereby electrostatically form a latent image over the toner image, a second developing device controllably driven on the basis of presence/absence of the second record signal and driven for a predetermined period of time prior to the start of a copying cycle for developing the latent image formed by the second writing device to produce a toner image, an image transferring device for transferring the toner images formed by the first and second developing devices to a recording medium at the same time, and a motor for driving only the second developing device.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
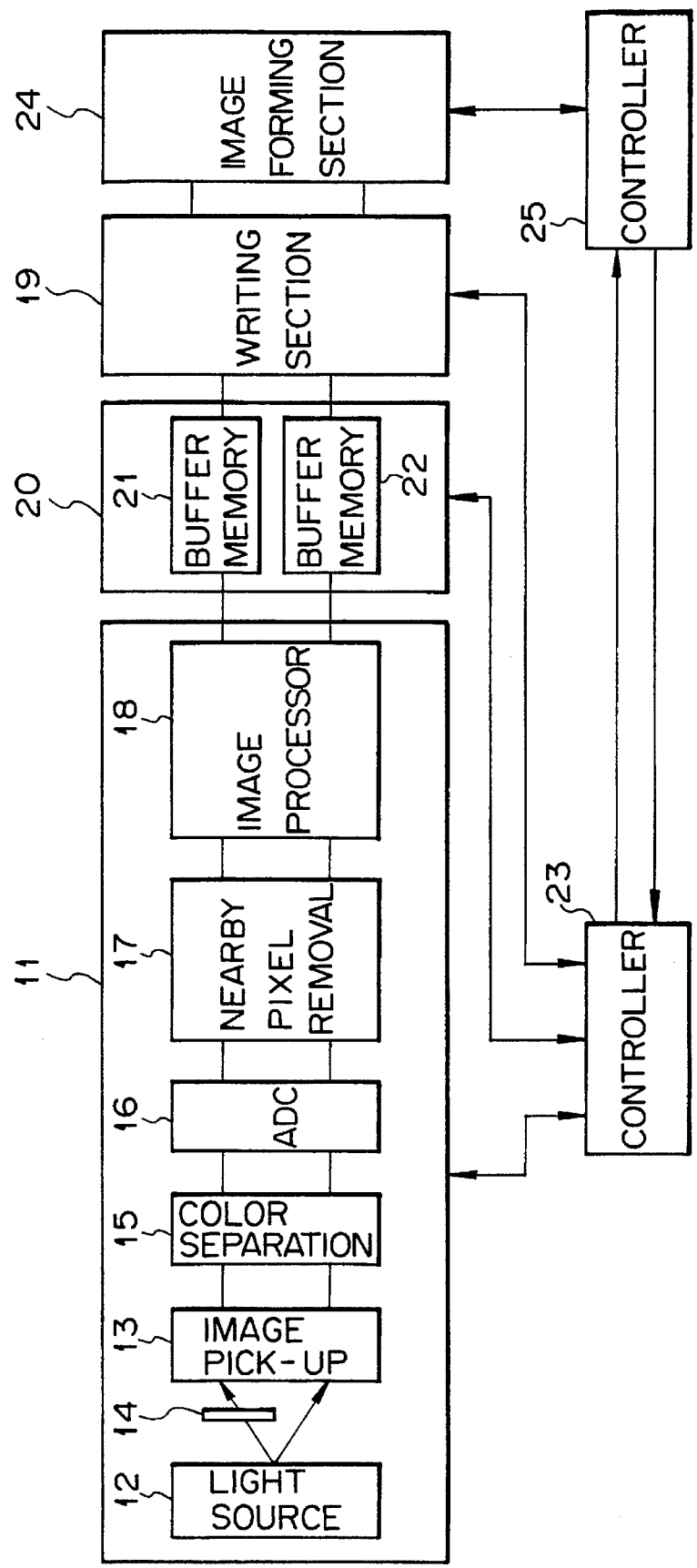
FIG. 1 is a block diagram schemaically showing a control system incorporated in a digital copier embodying the present invention.

Referring to FIG. 1 of the drawings, a control system incorporated in a digital copier embodying the present invention is shown. The digital copier is constructed to identify monocolor image data out of a document and produce a bicolor hard copy by using it and black image data. As shown, a reading section 11 includes a light source 12 for scanning a document laid on a glass platen through a slit in a direction perpendicular to the slit. The resulting reflection from the document is routed through a lens and mirrors to an image pick up device or photoelectric conversion device 13 in which a number of photoelectric conversion elements are arranged in two arrays perpendicular to the slit. Specifically, one of the two arrays receives a light image via a transmission filter 14 of particular color to be identified, i.e., the light image does not include image data of particular color. The other array receives a light image without the intermediary of the filter 14, i.e., a light image lying in the entire frequency band of the spectrum which is determined by the lens and mirrors. The output signals of the image pick-up device 13 are separated by a color separation circuit 15 into a monochromatic image signal in which all the colors have been converted into brightness signals and an image signal associated with the color of the filter 14. The two image signals from the color separation circuit 15 are transformed to digital signals by an analog-to-digital converter (ADC) 16. When nearby pixels exist between the resulting two digital image signals, a nearby pixel removal circuit 17 removes at least one of them, i.e., converts it to blank data. The outputs of the nearby pixel removal circuit 17 are subjected to predetermined image processing by an image processor 18, if necessary. The processed image signals from the image processor 18 are respectively written to buffer memories 21 and 22 which are incorporated in a video memory 20 for matching the reading section 11 to a writing section 19 with respect to timings. In response to a command from a controller 23, the writing section 19 converts the image data from the buffer memories 21 and 22 to optical signals at predetermined timings while writing them in a photoconductive element. An image forming section 24 is controlled by another controller 25 to electrophotographically write an image on the photoconductive element, develops it, and then transfers the developed image to a paper sheet. Interchanging data with the controller 23, the controller 25 sends to the controller 23 a timing signal for causing the writing section 19 to start writing and, at the same time, controls the image forming section 24 in matching relation to the timing signal. As a result, a monocolor hard copy corresponding to the data of the color identified by the filter 14 is produced. The reading section 11, writing section 19 and image forming section 24 have their timings controlled by the controller 23 and 25, and each sends or receives necessary data under the control of the controller 23 or 25 to execute the function thereof.

Figure 2:
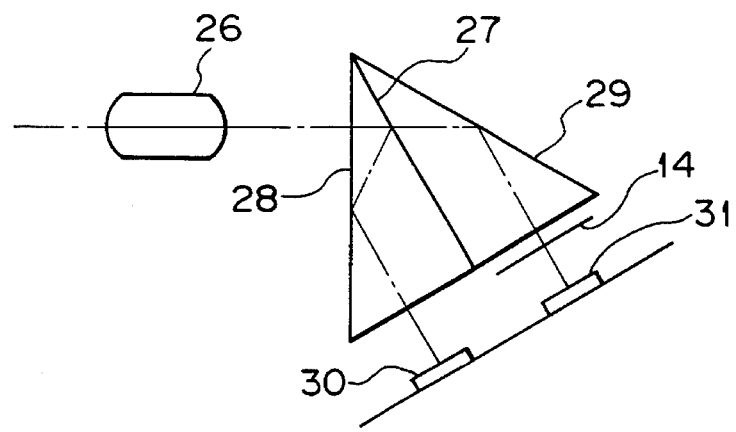
FIG. 2 shows a specific construction of an image pick-up device included in the system of FIG. 1.

FIG. 2 shows part of a specific construction of the reading system 11. The imgewise light from the document is condensed by a lens 26 and is then incident to two prisms 28 and 29 which have a half-mirror at the interface thereof. The half-mirror 27 splits the incident light into transmitted light and reflected light. The transmitted light and reflected light are totally reflected by the prisms 28 and 29 to be incident to CCD (Charge Coupled Device) arrays 30 and 31. The filter 14 of the same color as the color to be identified on a document is disposed between the prism 29 and the CCD array 31. When the color to be identified on a document is red, for example, the filter 14 will be a red absorption fitter. Using two prisms 28 and 29 is advantageous in that the CCD arrays 30 and 31 can be positioned in the same plane. Positioning the CCD arrays 30 and 31 in the same plane promotes easy assembly and adjustment. The lens 26, prism 28 and the reflecting surface of the half-mirror 27 are provided with such a characteristic that they do not absorb light of particular spectrum lying in the visible band and included in the image light from the document, so that white light representative of the document image is incident to the CCD array 30. More specifically, the CCD array 30 receives image information in the form of brightness information. Assuming that the filter 14 is a red filter, it absorbs light other than red so that the colors other than red and the reflection from a black image included in the information from the filter 14 are darkened. The reflection from a red image is transmitted through the red filter 14 while the reflection from a white image has only the red component thereof transmitted through the red filter 14. Therefore, in the information incident to the CCD array 31, the information associated with the white portion of the document and the information associated with the red portion have the same level, i.e., white and red cannot be distinguished from each other. Further, the reflections from the document other than the red and white portions have their quantities reduced due to the absorption by the red filter 14, resulting in dark image data. Stated another way, the image information received by the CCD array 31 differs from the image information received by the CCD array 30 in that it lacks red information. When the red filter 14 is replaced with a filter of another particular color, image information lacking information of the particular color will be received by the CCD array 31. A developing device assigned to a second color, which will be described, may have the toner thereof replaced with a toner of another color. Then, the color of a new toner and the color of a document to be identified should be matched. In such a case, the filter 14 preceding the CCD array 31 as illustrated is easy to replace. If the replacement of the filter 14 is not necessary, the prism 29 may be provided with the function of the filter 14, the effect of the filter 14 may be given to the light transmitted through the half-mirror 27, or the filter 14 may be adhered to the CCD array 31.

Figure 3:
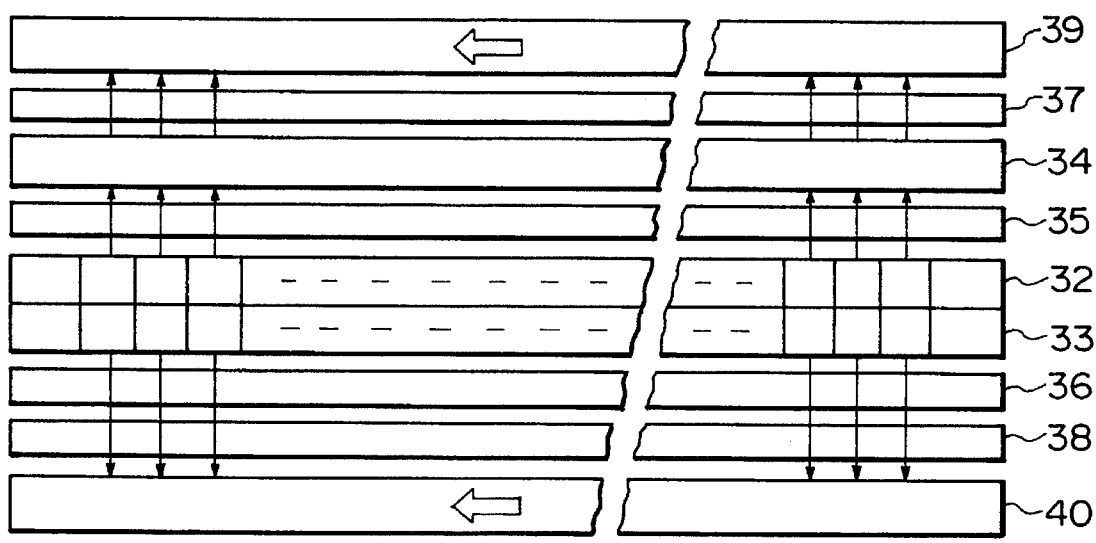
FIG. 3 shows another specific construction of the image pick-up device.

FIG. 3 shows another specific construction of the reading section 11. As shown, the reading section 11 has 2-line CCD light-sensitive sections 32 and 33 and a section for scanning the output signals of the light-sensitive sections 32 and 33. These sections are packed in an IC package having a window at the top thereof. In the light-sensitive sections 32 and 33, a number of light-sensitive elements are arranged at an interval corresponding to one pixel. The filter 14 is formed on the surface of the IC chip and in a position preceding the light-sensitive section 33. The light-sensitive section 33 receives imagewise light from a document via a lens and filter 14 and functions in the same manner as the CCD array 31 shown in FIG. 2. On the other hand, the light-sensitive section 32 receives the imagewise light without the intermediary of the filter 14 and has the same function as the CCD array 30 shown in FIG. 2. The lines formed by the light-sensitive sections 32 and 33 are perpendicular to the direction in which the reading section scans a document, and they are juxtaposed in the fucusing plane of the lens. Since the image focused onto the 2-line CCD image sensor moves as the scanning operation proceeds, the light-sensitive section 32 is located upstream of the light-sensitive section 33 with respect to the moving direction of the image on the fucsing plane. The image focused onto the light-sensitive sections 32 and 33 arranged in the scanning direction moves on the basis of the scanning speed. Since the interline distance of the light-sensitive sections 32 and 33 corresponds to one pixel, the scanning speed is predetermined such that the image moves a distance of one pixel on the focusing plane while the reading section 11 scans one pixel. Hence, the image sensed by the upstream section 32 is sensed by the downstream section 33 one pixel later in the subscanning direction. Since colors are distinguished by comparing image data of the same position of a document, an analog memory 34 is associated with the upstream section 32 to compensate for the delay of one pixel. The sections 32 and 33 each converts light from a document to an electric signal by the photoelectric conversion elements thereof, i.e., changes a current flowing therethrough in matching relation to the intensity of incident light and then integrates the change in the current to produce a corresponding amount of charge. Photostorage gates 35 and 36 control respectively the start and stop of integration by the sections 32 and 33. The analog memory 34 delays by one pixel the charges having been accumulated by the conversion elements of the section 32 by integration over a predetermined period of time. The delayed charges are transferred to a shift register 39 in parallel via a shift gate 37. The charges transferred to the shift register 39 and a shift register 40 are sequentially transferred in the direction of the line therein in response to a shift cock. At an output section, the charges are converted to voltages and then fed out as analog image data which correspond to the image data outputted by the CCD arrays 30 and 31, FIG. 2.

The arrangement shown in FIG. 3 cannot identify color components of a document except for one, compared to a 3-line CCD image sensor capable of identifying red, green and blue components by respective filters. Nevertheless, the image sensor of FIG. 3 allows the two light-sensitive sections 32 and 33 to adjoin each other since the photostroage gates 35 and 36, shift gates 37 and 38, shift registers 39 and 40 and analog memory 34 can be located at both sides of the sections 32 and 33. Therefore, a single analog memory 34 suffices in compensating for the time lag between the output signals of the light-sensitive sections 32 and 33. Furthermore, since IC fabrication technologies are directly applicable, the two lines of light-sensitive sections 32 and 33 can be readily provided with sufficient parallelism and alignment to in turn promote easy adjustment of the reading section 11. However, the image sensor of FIG. 3 has a built-in filter and, therefore, cannot change the color to be identified by changing only the filter.

Figure 4:
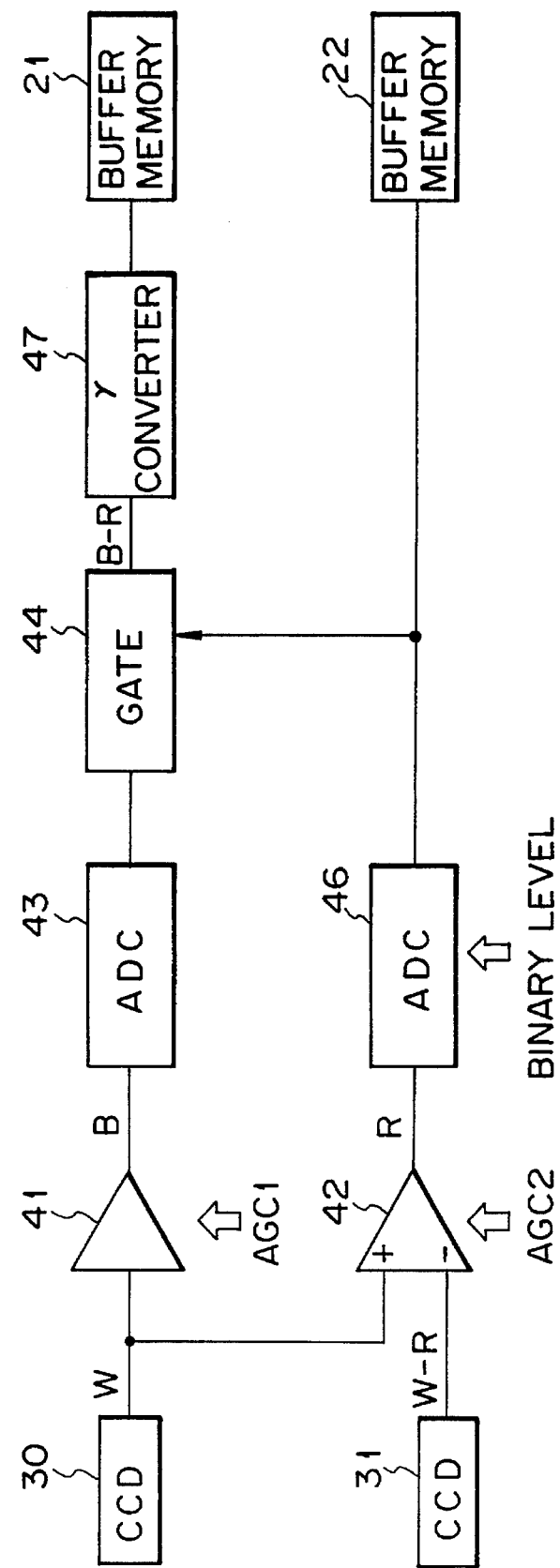
FIG. 4 is a block diagram schematically showing a specific construction of a reading section included in the system of FIG. 1.

FIG. 4 shows part of the reading section 11. The image signals from the CCD arrays 30 and 31 (or the image sensor shown in FIG. 3) are a signal not routed through the filter 14 and a signal lacking the color of the filter 14. Let the former signal and the latter signal be represented by W (white) and W–R (white image signal minus red image signal). W is applied to an amplifier 41 having a variable amplification. An externally derived signal AGC1 is set in the amplifier from a memory in response to a start command from the controller 23, FIG. 1, and in synchronism with the image signal. The amplifier 41 effects so-called shading correction, i.e., corrects the lowered quantity of peripheral light, the irregular illumination of the light source, and the irregular sensitivity among the conversion elements of the CCD arrays which are ascribable to the lens 26. Implemented as an inverting amplifier, the amplifier 41 produces a signal B (black image signal). An amplifier 42 receives W and W–R at input terminals thereof which are opposite in polarity. The amplifier 42 subtracts W–R from W and effects shading correction in response to an external signal AGC2 in the same manner as the amplifier 41, thereby producing an image signal R of the same color as the filter 14. B from the amplifier 41 is converted to a 6-bit digital data by an ADC 43 and then converted to image data B–R by a gate 44 which will be described.

R from the amplifier 42 is converted to a digital signal, i.e., binarized with respect to a predetermined level by a 1-bit ADC 46 and then written to the buffer memory 22. The ADC 46 can change the binarizing level thereof in response to a signal from the controller 23. Assuming that a document to be copied is a light pink paper sheet carrying an image thereon, one may desire to reproduce the background in red or in white. In such a case, the controller 23 causes the ADC 46 to change the binarizing level in response to a command signal entered on an operation board. A gate 44 closes when R from the ADC 46 exists or opens when R does not exist. The gate 44 is pulled down at the output side so as to produce blank data when closed. Therefore, B from the ADC 43 is simply gated by the gate 44 when R from the ADC 46 does not exist or is converted to blank data, B–R, by the gate 44 when R exists. If B from the ADC 43 is converted to blank data by R from the ADC 46 as stated, the occurrence that an image at a certain position is red and black at the same time substantially does not occur although the alignment or the parallelism of the CCD arrays may not be sufficient. The 6-bit B–R from the gate 44 is converted to 8-bit data by a gamma converter 47 which uses a table capable of selecting any sixty-four states represented by six bits out of 256 states represented by eight bits. The 8-bit data is written to the buffer memory 21. The gamma converter 47 is capable of rewriting the table under the control of the controller 23 to correct the input and output characteristics of the reading section 11, to correct the relation between the quantity of writing light in the image forming section 24 and the image density of a copy, to effect binarization, or to effect negative-to-positive reversal.

Figure 5:
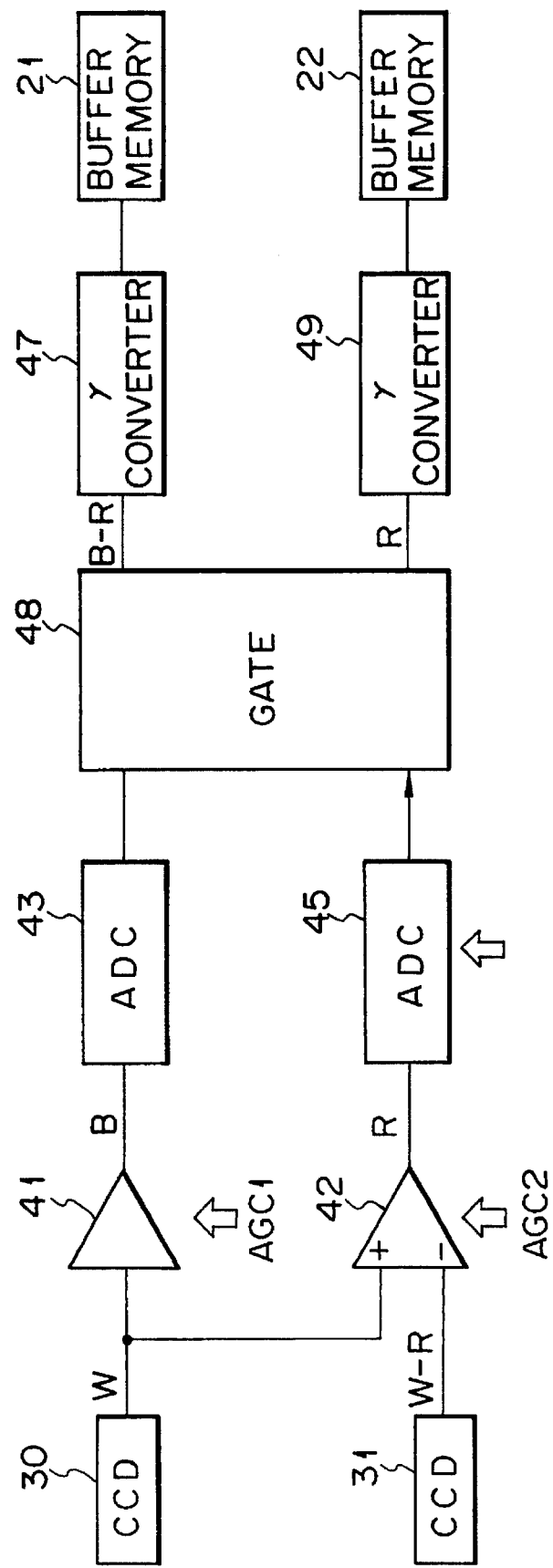
FIG. 5 is a block diagram showing another specific construction of the reading section.

When red image data should be written as multilevel data, the circuitry of FIG. 4 is replaced with circuitry shown in FIG. 5. In FIG. 5, the same components as those shown in FIG. 4 are designated by like reference numerals. As shown, R from the amplifier 42 is binarized by an ADC 45 with respect to a predetermined binarizing level and is converted to a 6-bit digital signal when higher than the binarizing level. The ADC 45 can change the binarizing level in response to a signal from the controller 23. B from the ADC 43 is simply gated by the gate 48 when binary data from the ADC 45 does not exist or is converted to blank data, B–R, when the binary data exists. 6-bit R from the gate 48 is converted to 8-bit data by a gamma converter 49 which uses a table capable of selecting any sixty-four states represented by six bits out of 256 states represented by eight bits. The resulting 8-bit data is written to the buffer memory 22. Therefore, B and R image data are switched to B–R and R by the gate 49 and do not overlap with each other.

Figure 6:
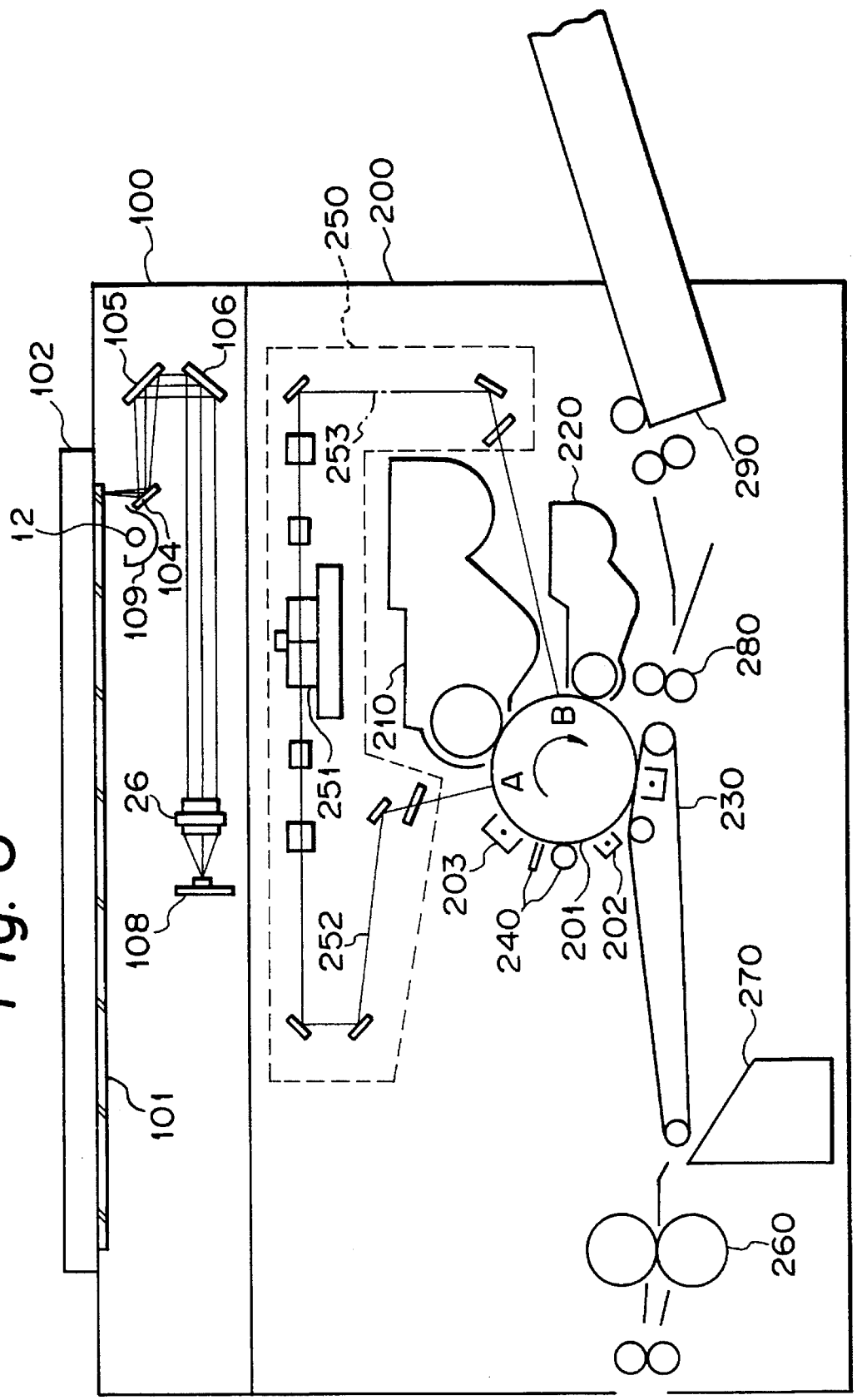
FIG. 6 is a section showing the general construction of the embodiment.

Referring to FIG. 6, the general arrangement of the digital copier embodying the present invention is shown. As shown, the copier has a document handling and reading section 100 and a printer section 200 for effecting electrophotograhic image formation below the section 100. The document handling and reading section 100 includes a glass platen 101 for laying a document, a cover plate 102 for pressing the document against the glass platen 101, a light source 12 for illuminating the document laid on the glass platen 101, a mirror 109 for reflecting light from the light source 12 toward the document, mirrors 104–106 and a lens 26 for focusing a reflection from the document onto an image pick-up device 108, and a drive mechanism including a motor for scanning the document, not shown. The image pick-up device 108 is implemented by the device shown in FIG. 2 (14 and 27–31) or the device shown in FIG. 3. As the operator lays a document on the glass platen 101 and then presses a print switch provided on the operation board, the copier starts on a copying operation. Specifically, the light source 12 is turned on to illuminate the document while, at the same time, the motor is energized to scan the document. The reflection from the document is incident to the image pick-up device 108 via the mirrors 104–106 and lens 26. In response, the image pick-up device 108 sequentially outputs image data line by line in conformity to the change in the scanning position on the document. The image data from the image pick-up device 108 is processed by the previously stated circuits 15–18 of the reading section 11 and then written to the video memory 20.

The printer section 200 includes a writing section 250 enclosed by a phantom line in the figure, a photoconductive element in the form of a drum 201, a black developing unit 210, a red developing unit 220, an image transfer and transport unit 230, a cleaning unit 240, a main charger 203 for charging the drum 201, a discharger 202, a fixing unit 260, a belt cleaning unit 270 for cleaning image transfer and transport unit 230, a paper feed unit 290 for feeding paper sheets, and a register unit 280 for matching a paper sheet and an image formed on the drum 201 with respect to position. The writing section 250 constitutes the writing section 19 shown in FIG. 1. The image forming section 24 shown in FIG. 1 is constituted by the various units of the printer section 200 other than the writing section 250. In the writing section 250, a motor, not shown, is drivably connected to a polygon mirror 251 having eight faces for deflecting a laser beam which has been modulated by a black image signal. Optical parts including an f-theta lens, mirrors and dust-proof glass causes the deflected laser beam to scan the drum 201 at a constant speed. The motor and optics form a beam 252. Another optics including an f-theta lens, mirrors and dust-proof glass causes the laser beam having been deflected by a different face of the polygon mirror 251 from the beam 252 to scan the drum 201 at a constant speed. The beam 252 and a beam 253 produced by the latter optics write respectively black image data and red image data in the drum 201. Since the two beams 252 and 253 are each steered by one of two different faces of the plygon mirror 251, they scan the drum 201 in opposite directions to each other.

Figure 7:
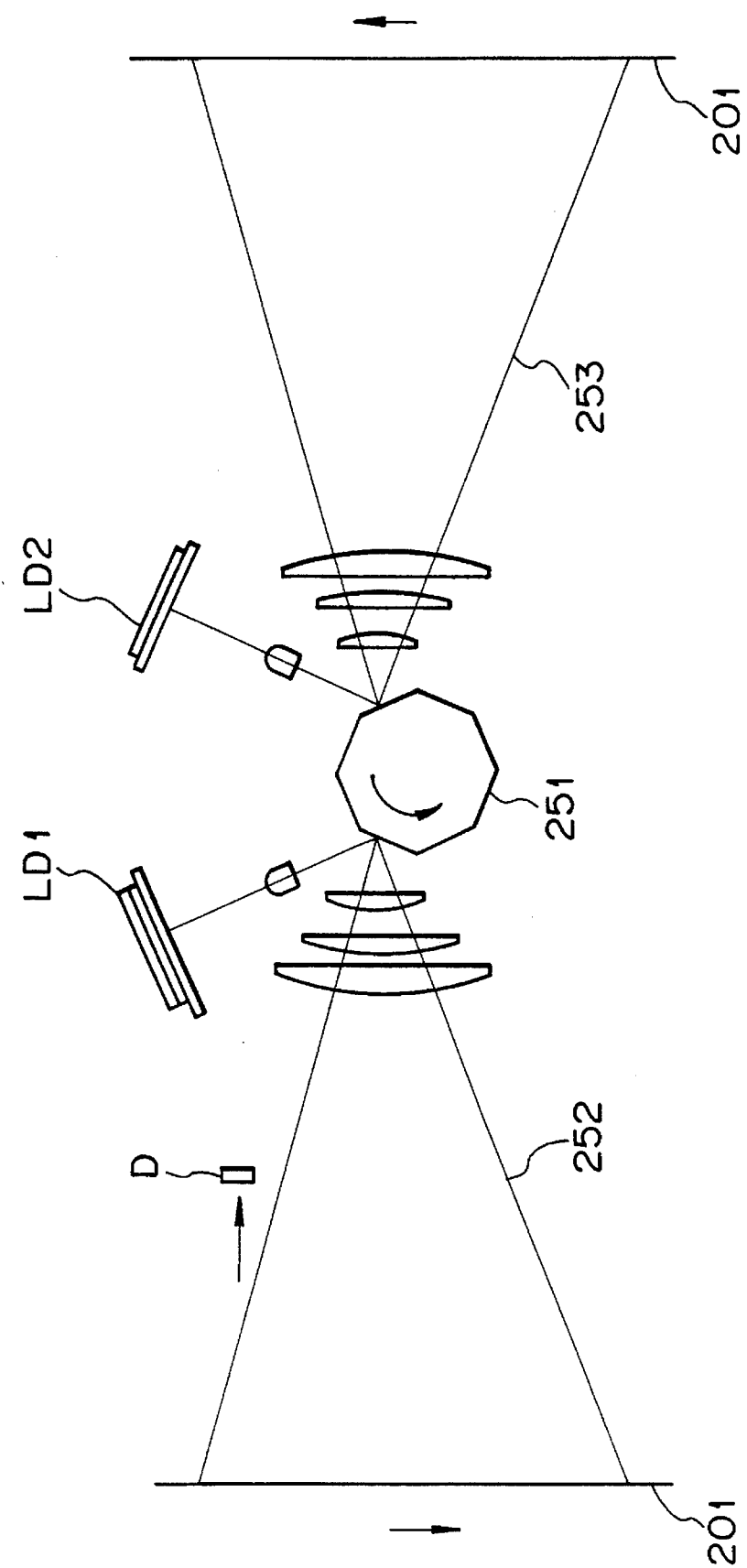
FIG. 7 is a top plan view of a polygon mirror included in a writing section of FIG. 6 and shows the surface scanned by beams in a developed view.

FIG. 7 shows the polygon mirror 251 in a top plan view while omitting the other mirrors and indicates the surface to be scanned by the beams 252 and 253 in a developed view. As shown, the polygon mirror 251 is rotated in a direction indicated by an arrow in the figure. The beams 252 and 253 scan the drum 201 in opposite directions, as also indicated by arrows. The positional relation between the beams 252 and 253 is determined by the positional relation between a semiconductor laser LD1 emitting a laser beam having been modulated by the black image signal and a semiconductor laser LD2 emitting a laser beam having been modulated by the red image signal and the polygon mirror 251. For this reason, a sensor D for sensing a beam at the outside of an image area to generate a beam modulation start timing line by line is associated only with the beam 252, i.e., the modulation start timing of the beam 253 is also generated by the sensor D. The beams 252 and 253 start writing image data at, respectively, positions A and B on the drum 201. Therefore, the timing for the beam 253 to write red image data is delayed by a period of time associated with the number of lines corresponding to the distance between the positions A and B, so that an image free from the deviation of the black and red image data may be formed on the drum 201. Specifically, the red image data to be written in the drum 201 at the downstream side is written to the buffer memory 22 after being delayed by the number of lines corresponding to the distance between the positions A and B.

A sequence of image forming steps particular to the embodiment is as follows. The main charger 203 uniformly charges the drum 201 being rotated by a main motor in a direction indicated by an arrow. The beam 252 modulated by the black image signal B–R from the buffer memory 21 writes image data on the charged surface of the drum 201 at the point A to thereby electrostatically form a latent image. The black developing unit 210 develops this latent image by a black toner to produce a black toner image. On the other hand, the beam 253 modulated by the red image signal R from the buffer memory 22 electrostatically forms a latent image over the black toner image at the point B. The red developing unit 220 develops the latent image formed by the beam 253 by a red toner without disturbing the black toner image, thereby producing a red toner image. A paper sheet fed from the paper feed unit 290 and driven by the register unit 230 to the image transfer and transport unit 230 at a predetermined timing such that the leading edge thereof meets that of the bicolor image formed on the drum 201. The image transfer and transport unit 230 transfers the bicolor image from the drum 201 to the paper sheet by corona discharge while transporting the paper sheet by a belt. The paper sheet with the toner image is further transported by the belt of the unit 230 to a fixing unit 260. After the toner image has been fixed on the paper sheet by the fixing unit 260, the paper sheet or copy is driven out of the copier. After the image transfer, the drum 201 is discharged by the charger 202 and the cleaned by the cleaning unit 240 to prepare for another image forming cycle. The belt of the image transfer and transport unit 230 transported the paper sheet is cleaned by the belt cleaning unit 270 to be thereby prevented from smearing the rear of the next paper sheet.

When the document laid on the glass platen 101 includes a red area, the red area is automatically separated and reproduced as a bicolor image in combination with a black image by the above-described procedure. This is effected at exactly the same speed as with a document on which an image is printed only in black. If the document carries only a black image, the embodiment reproduces it in black in the same manner as an ordinary copier. Since the red area is automatically processed, the operator does not have to see whether the document includes a red area or not.

The embodiment may have the same function as the function of a conventional monocolor copier or that of copier capable of effecting partial color changing, in addition to the function of coloring a copy by identifying the colors of a document.

Figure 8:
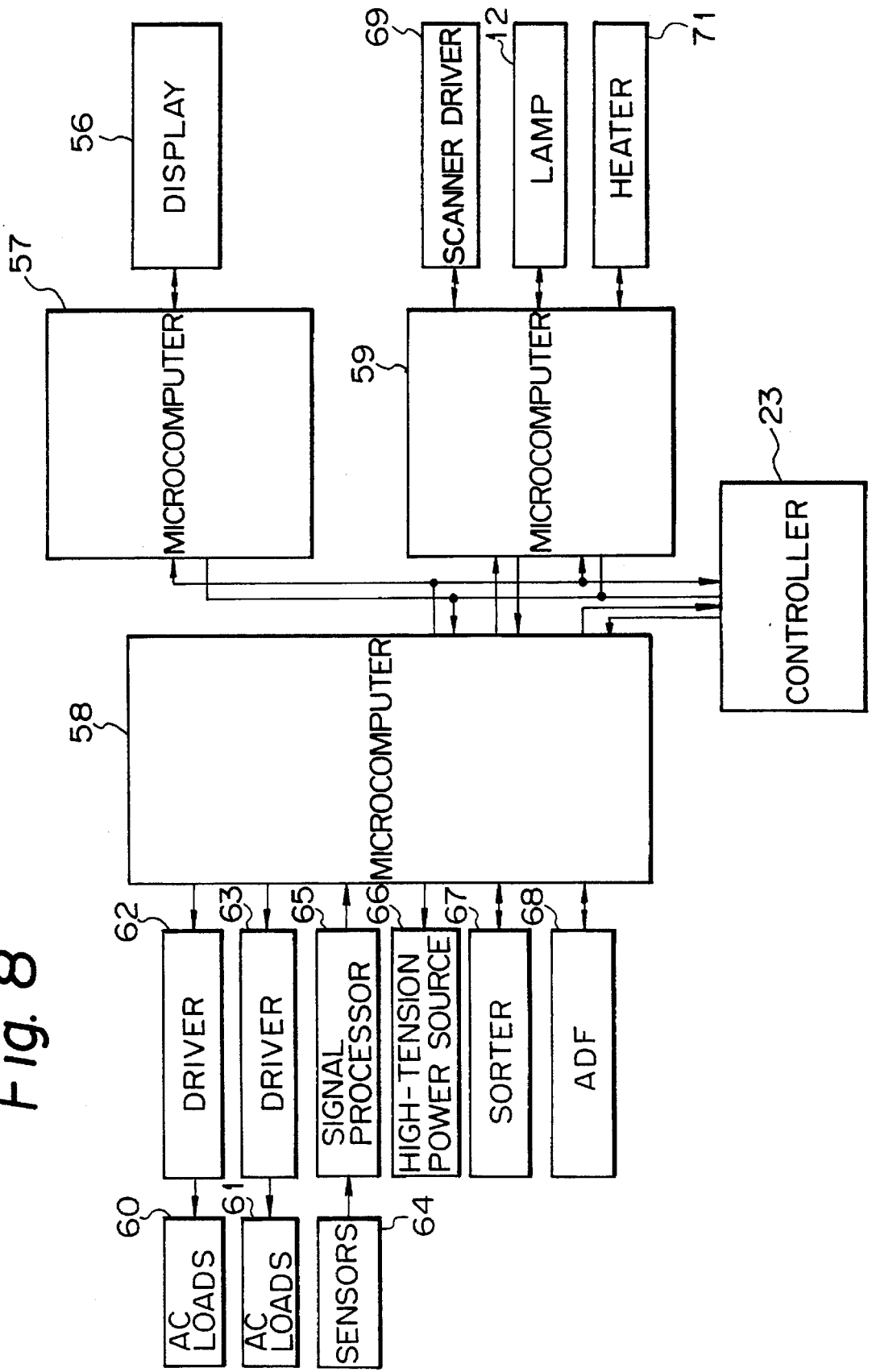
FIG. 8 is a block diagram schematically showing a controller of FIG. 1 together with associated circuit components.

A reference will be made to FIG. 8 for describing part of the controller 25 controlling the sections other than the reading section 11 and writing section 19. The part of the controller 25 which will be described mainly controls the printer section 200. As shown, the controller 25 has microcomputers 57–59. The microcomputer 57 drives various AC loads 60 and DC loads 61 included in the printer section 200, e.g., motors, solenoids and clutches by drivers 62 and 63 while receiving output signals of various sensors 64 via a signal processing circuit 65. The microcomputer 58 controls a high-tension power source 66 and various peripheral equipment such as a sorter 67 and an ADF (Automatic Document Feeder) 68. The microcomputer 59 controls a drive section 69 for scanning a document, the light source 12, and a heater 71 included in the fixing unit 260. The mirocomputers 57–59 are interconnected by communication paths, the microcomputer 58 serving as master. Paths for interchanging signals which are too fast to be dealt with by the communication paths are laid between the microcomputers 58 and 59 and between the microcomputers 57–59 and the controller 23. An interface is connected between the controller 23 which handles image data and the micocomputers 57–59.

How the embodiment drives the red developing unit 220 will be described. The buffer memory 21 shown in FIG. 1 temporarily holds black image data to be written first for the purpose of matching the reading section 11 to the writing section 19. The buffer memory 22 also shown in FIG. 1 holds red image data having been produced at the same timing as the black image data by the reading section 11 over a period of time necessary for a given position of the drum 201, FIG. 6, to move from the point A to the point B. When the red image data is to be written to the buffer memory 22, the controller 23 determines whether or not data to be written exists to thereby determine whether or not one bit of data is present on a main scanning line basis. On the change of the state associated with main scanning lines from "no data" to "data", the controller 23 sends a first timing signal to the controller 25. On the transition of the state from "data" to "no data", the controller 23 sends a second timing signal to the controller 25. On receiving the first timing signal, the microcomputer 58 included in the controller 25 starts a red developing unit drive timer and, as a predetermined period of time expires, generates a command for driving the red developing unit 220. On receiving the second timing signal, the micocomputer 58 starts a red developing unit off timer and, as a predetermined period of time expires, generates a command for stopping the operation of the red developing unit 220. The red developing unit off timer is cleared by the first timing from the controller 23. Even when the second timing signal is generated, the red developing unit 220 is continuously driven if the developing unit off timer is cleared by the first timing signal indicative of the occurrence of red image data before the time thereof expires.

After the red developing unit 220 has been stopped, it is driven again when the red developing unit off timer is cleared by the first timing signal. The delay time of the red developing unit drive timer is selected to be shorter than a period of time produced by subtracting the rising time of the red developing unit 220 from the time necessary for a given position of the drum 201 to move from the point A to the point B. Hence, when a given position of the drum 201 where black image data is written at the point A reaches the point B, the red developing unit 220 will have already risen. In the illustrative embodiment, the distance between the points A and B is 60 millimeters while the linear speed of the drum surface is 180 millimeters. Therefore, it takes the same position of the drum 201 ⅓ second to move from the point A to the point B, and the red developing unit drive timer rises within such a period of time.

The black developing unit 210 and red developing unit are driven by a common motor. The red developing unit 220 is driven by the motor via a clutch which couples and uncouples in response to, respectively, a drive command and a stop command meant for the unit 220. Since the rising time of the red developing unit 220 is tens of milliseconds, the red developing unit 220 can be controlled with a sufficient margin. The clutch replacing an exclusive motor for the developing unit 220 is successful in reducing the cost and size of the copier. Of course, an exclusive motor may be associated with the developing unit 220 to free reproduced images from disturbance ascribable to the irregular rotation of the drum 201.

Specifically, in a modification of the embodiment, an independent motor is exclusively assigned to the red developing unit 220. The above-described control means controls the slow start and the stop of such a motor in response to a start command and a stop command meant for the red developing unit 220. Although this modification slows down the rise of the developing unit 200, no problem arises if the rising time of the developing unit 220 is not longer than ⅓ second. When the motor is caused to start slowly, a mechanical shock ascribable to the start is noticeably reduced. Further, the allowable time margin may be positively allocated to the rise of the motor to further reduce the mechanical shock. In addition, this reduces the required motor torque and, therefore, promotes the use of a small motor.

The embodiment controls the stop of operation of the red developing unit 220 on the basis of the presence/absence of image data, as stated above. This effectively prevents the idling of the red developing unit 220, compared to previously stated Japanese Patent Laid-Open Publication No. 134660/1990 using a signal representative of the trailing edge of a paper sheet or an ordinary image forming apparatus locating a writing position and a developing position close to each other.

In the illustrative embodiment, the clutches, motors and control device associated therewith constitute part of the circuitry extending from the microcomputer 58 to the DC loads 61 via the driver 63.

A reference will be made to FIGS. 6–9 for describing a specific sequence which gives attention to the leading edge of an image. The black developing unit and red developing unit 220 each has a developing roller and supplies a developer to the drum 201 by the roller to develop a latent image. Assuming that image data exists at the leading end of an image, the writing of black image data in the drum 201 rises at the time when the data at the leading end of an image is written in the point A of the drum 201, FIG. 6. The black developing unit 210 rises at the time when the leading edge of the image reaches the position where the developing roller of the black developing unit 210 contacts the drum 201. Likewise, the writing of red image data in the drum 201 rises at the time when red image data positioned at the leading edge of an image is written in the point B of the drum 210, FIG. 6.

Figure 9:
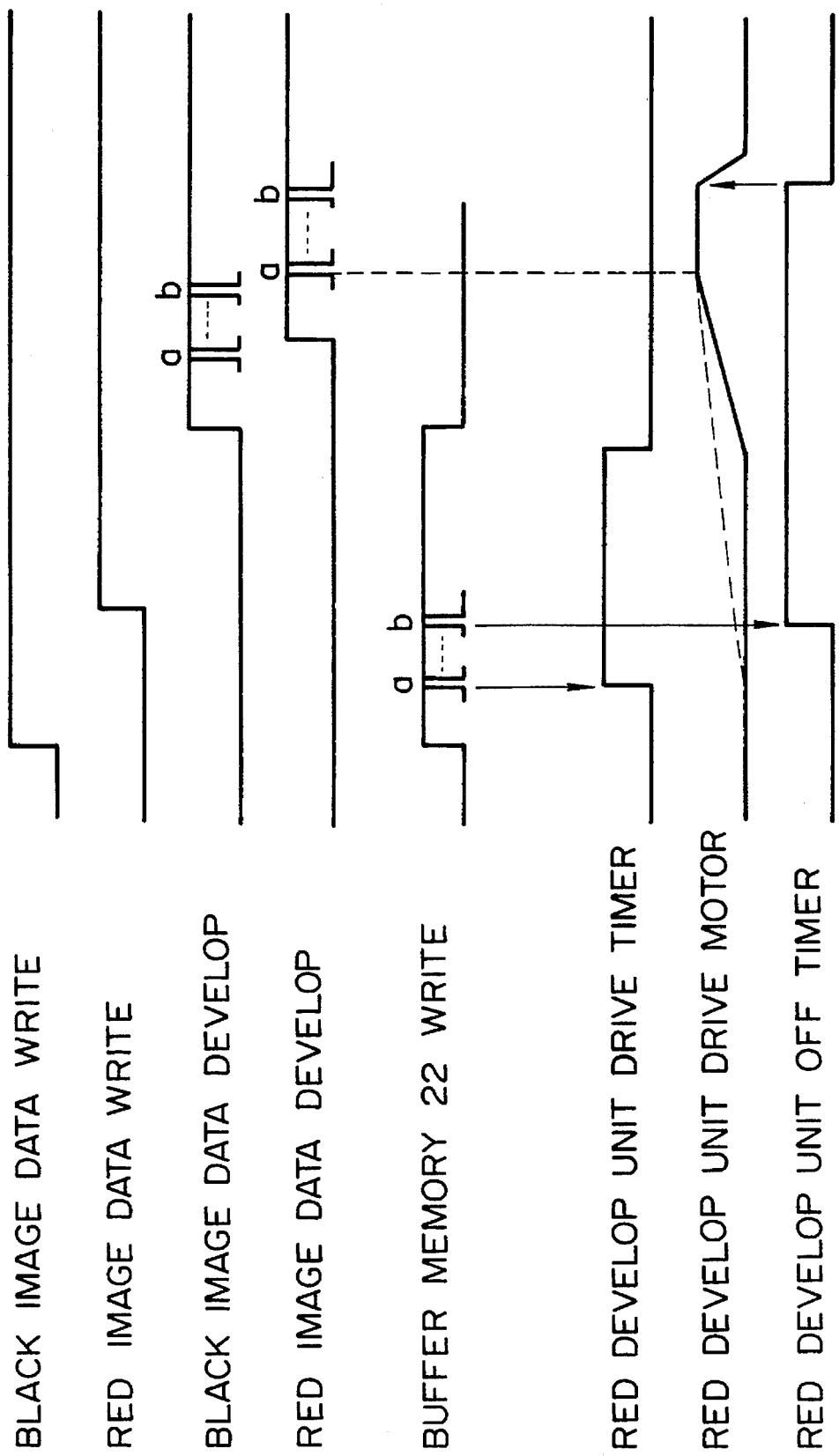
FIG. 9 is a timing chart representative of a sequence particular to the embodiment.

The red developing unit 220 rises at the time when the leading edge of the red image data reaches the position where the developing roller of the unit 220 contacts the drum 201. Since the buffer memory 21 for storing black image data has a minimum necessary capacity for matching the timings, the delay time ascribable to the buffer memory 21 is negligibly short, compared to the delay time ascribable to the buffer memory 22 dealing with red image data. For this reason, in FIG. 9, the writing of red image data is shown as rising simultaneously with the rising of the writing of black image data. The data written to the buffer memory 22 is read out on the elapse of the time necessary for the drum 201 to move from the point A to the point B and written in the drum 201. Assume that when red image data is to be written to the buffer memory 22, a main scanning line having at least one bit of data continuously appears from a timing a to a timing b, as shown in FIG. 9. Then, such data is continuously written at the point B from the timing a to the timing b and continuously developed by the red developing unit 220 over a period of time necessary for the movement from the timing a to the timing b. To allow the red developing unit 220 to effect development at such timings, the red developing unit drive timer is started at the timing a to effect a predetermined period of time of delay. As the time of this timer expires, the exclusive motor for driving the red developing unit 220 is energized to start slowly. The delay time of the red developing unit drive timer and the rising time of the above-mentioned motor are selected such that the rotation speed of the motor reaches predetermined one at least at the time when the red developing unit 220 is expected to develop the leading edge of red image data. At the timing b, i.e., on the transition from a main scanning line with red image data to a main scanning line without such data, the red developing unit off timer is started give a delay longer than at least the period of time necessary for the drum 201 to move from the point A to the point B. As soon as this timer is over, the motor for driving the developing unit 220 is deenergized.

In the previous embodiment which does not use a clutch and allocates all the time margin to the rising of the red developing unit 220, the delay time of the red developing unit drive timer is zero. In this case, the timings of this drive timer shown in FIG. 9 define the timings of the clutch, so that the gradient of rise is steeper.

Figure 10:
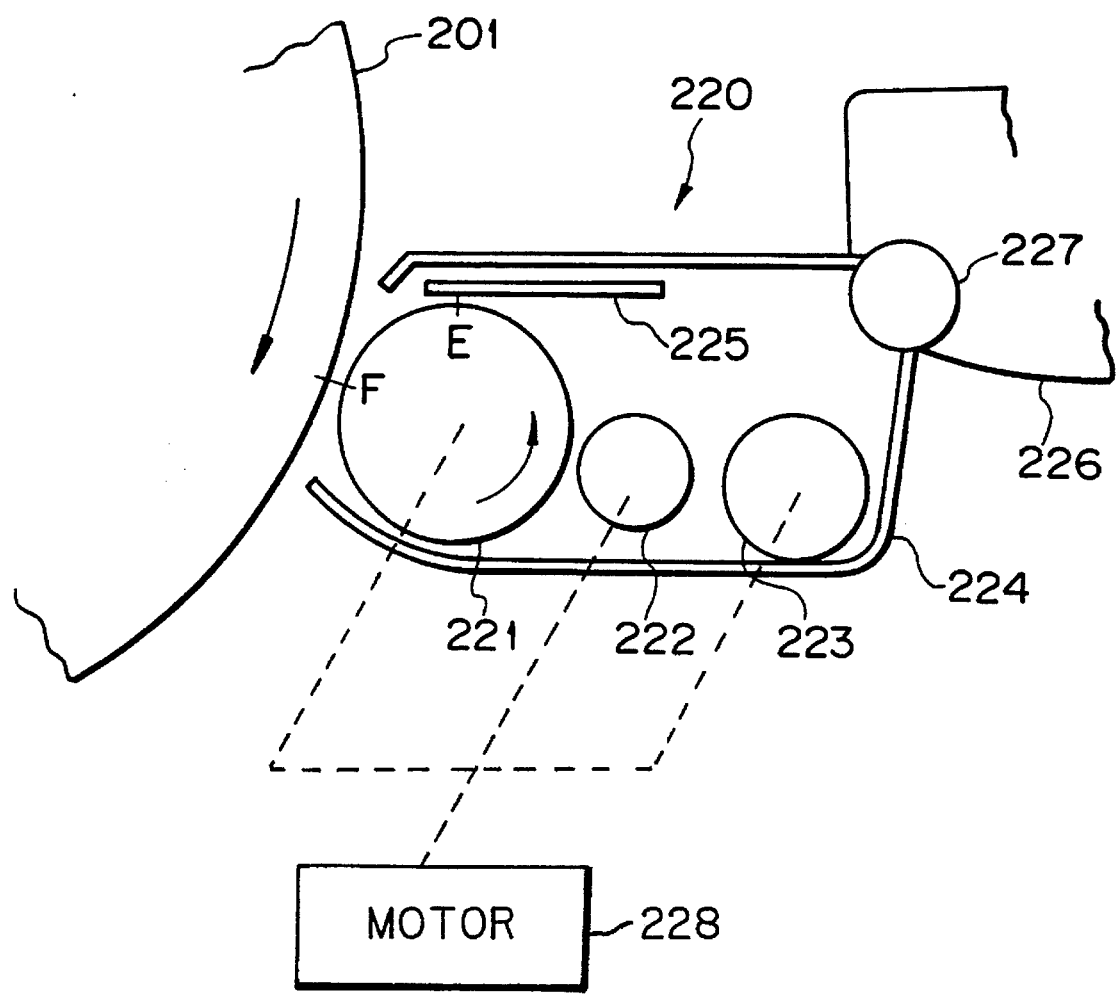
FIG. 10 is a section showing another specific construction of a red developing unit included in the embodiment.

Referring to FIG. 10, another specific construction of the red developing unit 220 is shown which is driven not only to develop red image data but also to maintain the toner uniform, to refresh the toner deposited on the developing roller, and to transport a supplementary toner. The red developing unit 220 shown in FIG. 10 is implemented as a one-component jumping developing unit. As shown, the developing unit 220 has a developing roller 221 and rollers 222 and 223 which are driven by a motor 228 either directly or via a clutch. The developing roller 221 supplies a toner from a casing 224 thereof to the drum 201 to develop red image data written in the drum 201. A blade 225 forms a thin toner layer on the developing roller 221. A roller 227 is rotated to feed a supplementary amount of toner from a toner container 226 to the casing 224. Then, the rollers 222 and 223 convey the toner to the developing roller 221. The toner is charged by friction when transferred from the roller 222 to developing roller 221 and when regulated by the blade 225. Only the toner lying in the range from a position E where the blade 225 regulates the toner thickness to a position F which is closest to the drum 201 and where the toner is fed to the drum 201 is ready to develop a latent image. Therefore, to refresh the toner before development, it is necessary at least to charge and thin the toner layer lying in the range E–F on the developing roller 221. In the developing unit 220, the amount of charge of the toner and the amount of toner on the developing roller 221 depend on the toner thinning speed. In light of this, the delay time of the red developing unit drive timer is set such that after a target speed has been reached, the development of red image data begins when the developing unit 220 is continuously driven over a period of time necessary for the toner layer to be formed from the position E to the position F on the developing roller 221.

When red image data is to be written to the buffer memory 22 which adjusts the time lag between the writing of black image data send that of red image data, the embodiment controls the drive of the red developing unit 220 by determining whether or not red image data is present. The embodiment, therefore, sees if red image data is present earlier than the apparatus of Japanese Patent Laid-Open Publication No. 134660/1990 which effects such a decision at the time of writing data in a drum, by more than a period of time corresponding to the above-mentioned time lag. It follows that the drive of the developing unit 220 can be started earlier by the period of time necessary for the unit 220 to rise or even by more than such a period of time even if the red image data writing position and the developing position are positioned structurally as close to each other as possible. This reduces the overall size of the apparatus. Moreover, since the presence/absence of red image data is determined sufficiently before the rising time of the developing unit 220, excessive idling of the developing unit is eliminated. As a result, there are eliminated various undesirable occurrences such as the deterioration and scattering of the developer, accidental deposition of toner on reproductions, and decrease in the life of the apparatus due to degraded functions.

When the red developing unit 220 is driven by an exclusive motor 228 to start slowly, the mechanical shock ascribable to the start of the unit 220 can be suppressed to a negligible level. On the other hand, when the developing unit 220 shares a single motor 228 with the drum 201 and driven by the motor via a clutch, it is not directly connected to the drum 201. This frees the drum 201 from noticeably irregular rotation and thereby allows a minimum of disturbance to images ascribable thereto to occur. Regarding the stop of operation of the developing unit 220, a main scanning line having at least one bit of data and a main scanning line having no data are respectively detected as "data" and "no data". The developing unit drive timer is started on the transition from "no data" to "data". The drive of the developing unit 220 is turned off when the time of the timer expires. Therefore, when a single copy is being produced, the drive of the developing unit 220 stops as soon as red image data disappears to thereby minimize the idling of the unit 220. In addition, even after the transition from "data" to "no data", the developing unit 220 is driven again when data is detected. In this manner, when red image data are scattered on a single document, such data can be developed while the idling of the developing unit 220 is prevented in the area where no data exists.

If the red developing unit 220 does not idle at all, it will not rotate at all while documents void of red images are continuously copied. To eliminate this problem the developing unit 220 may be rotated before each copying cycle or a sequence of continuous copying cycles or at a predetermined time after the turn-on of the power source. Such a rotation is effected at least for a period of time necessary for the developing roller 221 to move from the thin layer forming position E to the developing position F. Thereafter, the toner on the developing roller 221 is refreshed. To stabilize the amount of charge of refreshed toner, the developing unit 220 is driven for the period of time necessary for the developing roller 221 to move from the position E to the position F after reaching a steady rotation speed.

If the idling of the red developing unit 220 is short, it is likely that the transport of the toner fed to the roller 277 to the developing roller 221 by the rollers 223 and 224 is disturbed, depending on the toner transporting ability of the rollers 223 and 224. Such an occurrence is eliminated by matching the delay time of the above-stated timer to the toner transporting ability. Even when the developing unit 220 is held in a halt to avoid idling, a bias voltage for development is applied to the developing roller 221 to prevent the black toner deposited on the drum 201 by the black developing unit 210 from being mixed with the toner of the developing roller 221.

The embodiment has been shown and described as develop by the black toner stored in the first developing unit 210 and then develop by the red toner stored in the second developing unit 220 and matches the function of identifying the color of a document to the colors of the developing units 210 and 220. Alternatively, development may be effected in a color different from the color to be identified in order to attain a special effect. Further, the color which the operator desired to distinguish from the others sets with no regard to the color to be identified may be changed in matching relation to the color of a toner stored in the second developing unit 220 which can be mounted on the printer section 200 with any one of toners of different colors. In light of this, the color of a toner stored in the developing unit 220 and the color to be identified may be displayed on an operation and display board 56.

In summary, it will be seen that the present invention provides a miniature digial copier which reduces the idling of a developing device thereof and prevents reproduced images from being disturbed by reducing a mechanical shock ascribable to a change in the load acting on a motor.

Various modifications will become possible for those skilled in the art after receiving the teachings of the present disclosure without departing from the scope thereof.

What is claimed is:

1. An electrophotographic digital photocopier comprising:

a photoconductive element;

scanning means for optically scanning a printed image to be copied and for outputting a first optical signal and a second optical signal;

image processing means for receiving said first optical signal and said second optical signal and for outputting a first record signal and a second record signal, said first record signal and said second record signal respectively representing intensities of a first color and a second color present in said printed image;

first writing means for writing first image data onto said photoconductive element in accordance with said first record signal to thereby form a first latent image;

first developing means for developing said first latent image to thereby form a first toner image;

second writing means for writing second image data onto said photoconductive element in accordance with said second record signal to thereby electrostatically form a second latent image superimposed on said first toner image;

second developing means for developing said second latent image to thereby form a second toner image;

image transferring means for simultaneously transferring said first toner image and said second toner image to a recording medium;

signal detecting means for determining whether or not said image processing means has received said second record signal and for outputting a detection signal; and control means for controlling both a start timing and a stop timing of a driving of said second developing means in accordance with a timing of outputting of said detection signal from said signal detecting means such that said second developing means is driven only during time periods when said second color is being developed, wherein said second image data is written onto said photoconductive element after said first developing means has developed said first latent image, but before said first toner image is transferred to said recording medium.

2. An electrophotographic digital photocopier according to claim 1, wherein said control means controls a start timing and a stop timing of said second developing means such that a driving of said second developing means begins when said signal detecting means detects receipt of said second record signal by said reading means and ends a predetermined amount of time after said signal detecting means has detected an absence of said second recording signal at said reading means.

3. An electrophotographic digital photocopier according to claim 1, wherein said control means controls a start timing of said second developing means such that a driving of said second developing means begins a predetermined amount of time after said signal detecting means detects receipt of said second record signal by said reading means, said predetermined amount of time being equal to an amount of time necessary for said second image data written on to said photoconductive element to arrive at a developing position of said second developing means.

4. An electrophotographic digital photocopier according to claim 1, wherein said control means controls a stop timing of said second developing means such that a driving of said second developing means ends at least a predetermined amount of time after said signal detecting means detects an absence of said second record signal at said reading means, said predetermined amount of time being equal to an amount of time necessary for said second image data written onto said photoconductive element to arrive at a developing position of said second developing means.

5. An electrophotographic digital photocopier according to claim 1, further comprising a motor for driving only said second developing means.

6. An electrophotographic digital photocopier according to claim 5, further comprising rotation control means for causing said motor to start operating slowly.

7. An electrophotographic digital photocopier comprising:

a photoconductive element;

scanning means for optically scanning a printed image to be copied and for outputting a first optical signal and a second optical signal;

image processing means for receiving said first optical signal and said second optical signal and for outputting a first record signal and a second record signal, said first record signal and said second record signal respectively representing intensities of a first color and a second color present in said printed image;

first writing means for writing first image data onto said photoconductive element in accordance with said first record signal to thereby electrostatically form a first latent image;

first developing means for developing said first latent image to thereby form a first toner image;

second writing means for writing second image data onto said photoconductive element in accordance with said second record signal to thereby electrostatically form a second latent image superimposed on said first toner image;

second developing means controllably driven based on receipt of said second record signal by said image processing means such that a driving of said second developing means begins at a time before said second latent image arrives at a developing position and continues for a predetermined period of time thereafter, to develop said second latent image and thereby form a second toner image, said second developing means being driven only during time periods when said second color is being developed; and image transferring means for simultaneously transferring said first toner image and said second toner image to a recording medium, wherein said second image data is written onto said photoconductive element after said first developing means has developed said first latent image, but before said first toner image is transferred to said recording medium.

8. An electrophotographic digital photocopier according to claim 7, wherein said second developing means forms a thin layer of developing material on a surface of a rotating developing roller to develop said second latent image at said developing position, and wherein said predetermined period of time during which said second developing means is driven is equal to at least a period of time necessary for said rotating developing roller to rotate an area said surface on which said thin layer of developing material is formed to said developing position.

9. An electrophotographic digital photocopier as claimed in claim 7, wherein said second developing means forms a thin layer of developing material on a surface of a rotating developing roller to develop said second latent image at said developing position, and wherein said predetermined period of time during which said second developing means is driven is equal to at least a period of time necessary for said rotating developing roller to reach a steady rotation speed and to rotate an area of said surface on which said thin layer of developing material is formed to said developing position.

10. An electrophotographic digital photocopier comprising:

a photoconductive element;

scanning means for optically scanning a printed image to be copied and for outputting a first optical signal and a second optical signal;

image processing means for receiving said first optical signal and said second optical signal and for outputting a first record signal and a second record signal, said first record signal and said second record signal respectively representing intensities of a first color and a second color present in said printed image;

first writing means for writing first image data onto said photoconductive element in accordance with said first record signal to thereby electrostatically form a first latent image;

first developing means for developing said first latent image to thereby form a first toner image;

second writing means for writing second image data onto said photoconductive element in accordance with said second record signal to thereby electrostatically form a second latent image superimposed on said first toner image;

second developing means controllably driven based on receipt of said second record signal by said image processing means such that a driving of said second developing means begins prior to developing of said second latent image during each copying cycle and continues for a predetermined period of time thereafter to develop said second latent image at a developing position and thereby form a second toner image, said second developing means being driven only during time periods when said second color is being developed; and image transferring means for simultaneously transferring said first toner image and said second toner image to a recording medium, wherein said second image data is written onto said photoconductive element after said first developing means has developed said first latent image, but before said first toner image is transferred to said recording medium.

11. An electrophotographic digital photocopier according to claim 10, wherein said second developing means forms a thin layer of developing material on a surface of a rotating developing roller to develop said second latent image at said developing position, and wherein said predetermined period of time during which said second developing means is driven is equal to at least a period of time necessary for said rotating developing roller to rotate an area of said surface on which said thin layer of developing material is formed to said developing position.

12. An electrophotographic digital photocopier according to claim 10, wherein said second developing means forms a thin layer of developing material on a surface of rotating developing roller to develop said second latent image at said developing position, and wherein said predetermined period of time during which said second developing means is driven is equal to a least a period of time necessary for said rotating developing roller to reach a steady rotation speed and to rotate an area of said surface on which said thin layer of developing material is formed to said developing position.

13. An electrophotographic digital photocopier comprising:

a photoconductive element;

scanning means for optically scanning a printed image to be copied and for outputting a first optical signal and a second optical signal;

image processing means for receiving said first optical signal and said second optical signal and for outputting a first record signal and a second record signal, said first record signal and said second record signal respectively representing intensities of a first color and a second color present in said printed image;

first writing means for writing first image data onto said photoconductive element in accordance with said first record signal to thereby electrostatically form a first latent image;

first developing means for developing said first latent image to thereby form a first toner image;

second writing means for writing second image data onto said photoconductive element in accordance with said second record signal to thereby electrostatically form a second latent image superimposed on said first toner image;

second developing means controllably driven based on receipt of said second record signal by said image processing means such that said second developing means is driven for a predetermined period of time prior to the beginning of a copying cycle to develop said second latent image and thereby form a second toner image;

image transferring means for simultaneously transferring said first toner image and said second toner image to a recording medium; and a motor for driving only said second developing means such that said second developing means is driven only when said second color is being developed, wherein said second image data is written onto said photoconductive element after said first developing means has developed said first latent image, but before said first toner image is transferred to said recording medium.

* * * * *